US008264186B2

(12) United States Patent
Hanai et al.

(10) Patent No.: US 8,264,186 B2
(45) Date of Patent: Sep. 11, 2012

(54) CONTROL DEVICES FOR FUEL PUMP DRIVING MOTORS

(75) Inventors: Kazumichi Hanai, Nagoya (JP); Kazuhiro Yoneshige, Nagoya (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 320 days.

(21) Appl. No.: 12/588,864

(22) Filed: Oct. 30, 2009

(65) Prior Publication Data

US 2010/0111710 A1 May 6, 2010

(30) Foreign Application Priority Data

Oct. 31, 2008 (JP) ................................ 2008-280903

(51) Int. Cl.
*H02P 7/18* (2006.01)

(52) U.S. Cl. ........ 318/504; 318/244; 318/245; 318/246; 318/247; 318/248

(58) Field of Classification Search .................. 318/504, 318/244, 245–252
See application file for complete search history.

(56) References Cited

U.S. PATENT DOCUMENTS

| | | | | |
|---|---|---|---|---|
| 5,602,957 | A * | 2/1997 | Wille et al. | 388/836 |
| 5,842,454 | A * | 12/1998 | Miwa et al. | 123/497 |
| 5,915,070 | A * | 6/1999 | Takekawa et al. | 388/811 |
| 6,295,879 | B1 * | 10/2001 | Miller et al. | 73/862.08 |
| 2006/0275135 | A1 * | 12/2006 | Nation et al. | 417/12 |
| 2006/0275137 | A1 * | 12/2006 | Kempfer et al. | 417/44.1 |

FOREIGN PATENT DOCUMENTS

| | | |
|---|---|---|
| DE | 1 638 270 | 7/1971 |
| JP | 11-285220 | 10/1999 |
| JP | 2002-345214 | 11/2002 |
| JP | 2008-079388 | 4/2008 |

* cited by examiner

*Primary Examiner* — Walter Benson
*Assistant Examiner* — David Luo
(74) *Attorney, Agent, or Firm* — Dennison, Schultz & MacDonald

(57) ABSTRACT

The present invention includes a control device capable of applying a high voltage to a motor of a fuel pump for an appropriate period of time during a low voltage operation of the motor.

6 Claims, 7 Drawing Sheets

Te:$T_L$-Ts>REFERENCE PERIOD OF TIME (tw)

CONTROL DEVICES FOR FUEL PUMP DRIVING MOTORS

This application claims priority to Japanese patent application serial number 2008-280903, the contents of which are incorporated herein by reference.

BACKGROUND OF THE INVENTION

Field of the Invention

The present invention relates to control devices for controlling fuel pump driving motors having a commutator and brushes.

Japanese Laid-Open Patent Publication No. 2008-79388 discloses a fuel pump having a motor. The fuel pump is adapted to pump fuel stored within a fuel tank and to feed the fuel to an engine. Depending on operating conditions of the engine, the fuel pump can be switched between two modes including a high flow rate mode and a low flow rate mode. In order to achieve a high flow rate, a voltage applied to the motor is increased (for example, to about 12V) for increasing the rotational speed of the motor. Thus, the rotational speed of an impeller (vane) is increased to increase the flow rate of the pumped fuel. On the other hand, in order to achieve a low flow rate, a voltage applied to the motor is decreased (for example, to about 7V) to decrease the rotational speed of the motor.

In the case of the motor of the above publication, an electrically resistive film may be produced between the commutator and the brushes during the operation of the motor. However, because an electric discharge may be produced between the commutator and the brushes, the electrically resistive film may be destroyed to some extent by the discharge energy.

For example, when the voltage applied to the fuel pump motor is set to a high voltage (e.g., 12V) as shown in FIG. 7(B), the electrically resistive film may be destroyed enough by the discharge energy, so that growth of the electrically resistive film between the commutator and the brushes can be inhibited. Therefore, the electrical resistance between the commutator and the brushes of the fuel pump motor may not increase with time, and the rotational speed of the motor can be held to be substantially constant. Hence, as shown in FIG. 7(A), the flow rate of the fuel pumped by the fuel pump may not decrease with time from an initial flow rate QM and can be maintained to be constant.

However, when the voltage applied to the fuel pump motor is set to a low voltage (e.g., 7V) as shown in FIG. 7(D), the electrically resistive film may not be destroyed enough because the discharge energy is small. Therefore, the electrically resistive film may gradually grow to increase the contact resistance between the commutator and the brushes, so that the rotational speed of the fuel pump motor may gradually decrease. Hence, the flow rate of the pumped fuel from the fuel pump decreases with time from the initial flow rate QL. As a result, there is a possibility to cause insufficient acceleration of the rotational speed of the engine if the fuel pump is operated during a long time while the flow rate mode for the pumped fuel being switched to provide the initial flow rate QL or a low flow rate mode.

Therefore, there is a need in art for a fuel pump motor that can prevent a flow rate of a pumped fuel from decreasing to be lower than a tolerable range when the motor is switched to a low voltage operation mode.

SUMMARY OF THE INVENTION

One aspect according to the present invention includes a control device capable of applying a high voltage to a motor of a fuel pump for an appropriate period of time during a low voltage operation of the motor.

DETAILED DESCRIPTION OF THE INVENTION

Figure 1:
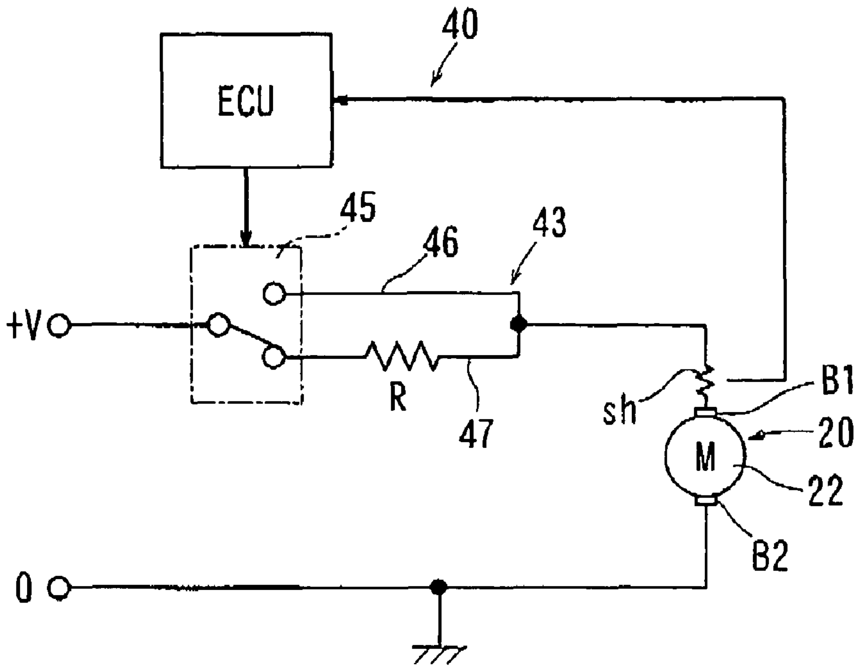
FIG. 1(A) is a schematic circuit configuration of a control device for controlling a fuel pump motor according to an embodiment of the present invention.
FIG. 1(B) is a schematic diagram showing different waveforms of a current applied to the motor.
Figure 1:
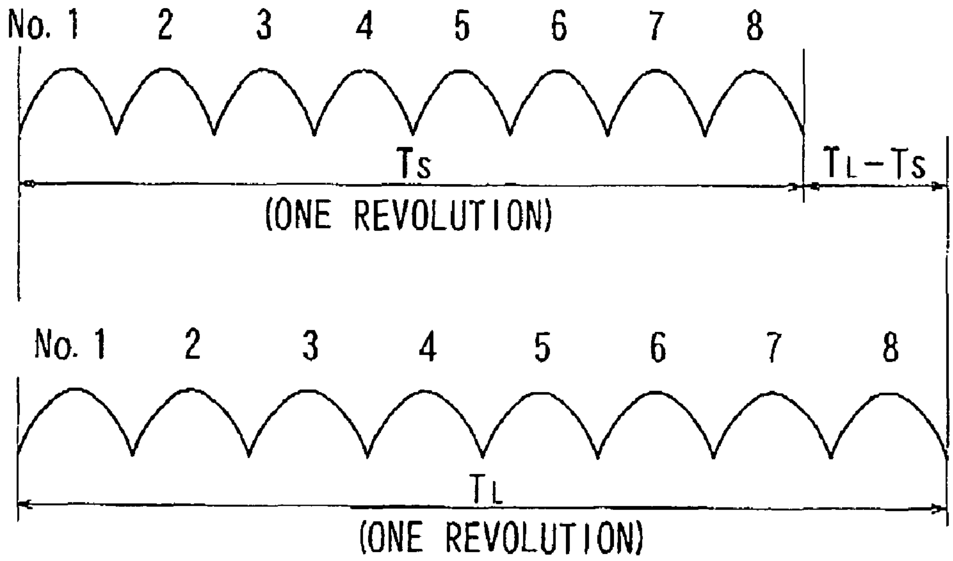
Figure 2:
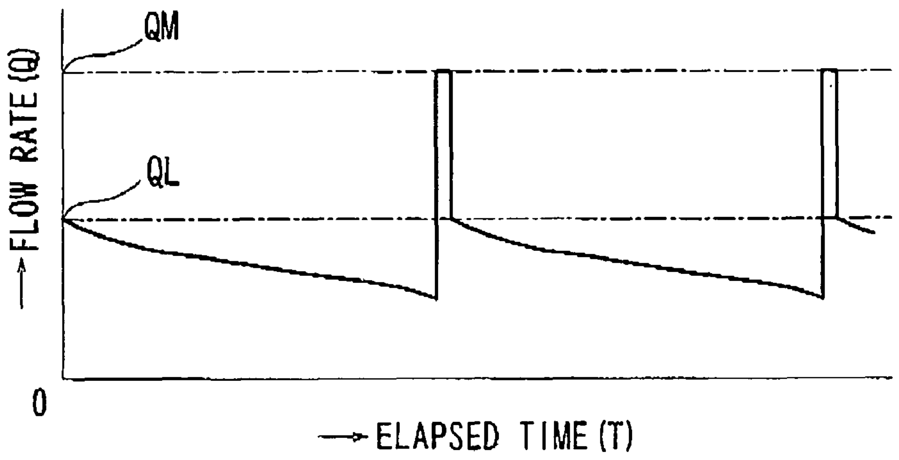
FIG. 2(A) is a graph showing change of a flow rate of a fuel with time.
FIG. 2(B) is a graph showing change of a voltage applied to the fuel pump motor.
Figure 2:
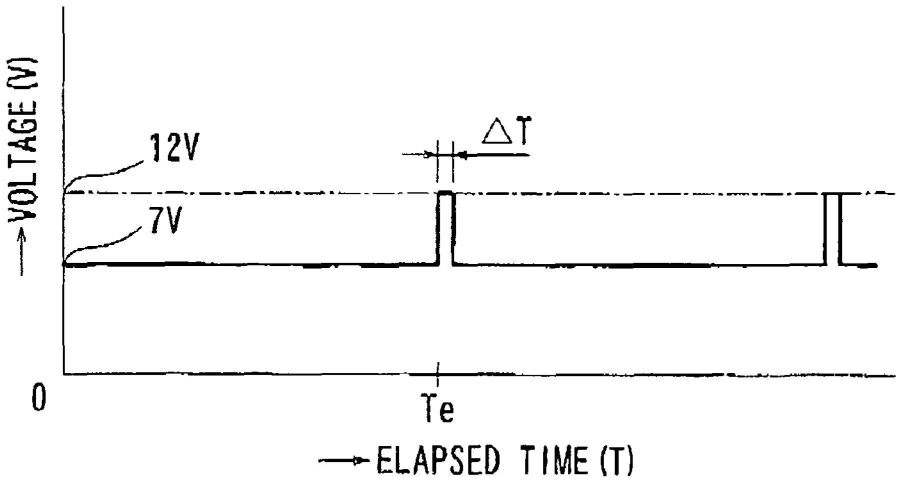

Each of the additional features and teachings disclosed above and below may be utilized separately or in conjunction with other features and teachings to provide improved control devices for controlling motors of fuel pumps. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a control device for controlling a motor having a commutator and brushes of a fuel pump includes a voltage applying device and a voltage switching device. The voltage applying device is operable to selectively apply a first voltage and a second voltage to the motor, the second voltage being lower than the first voltage. The voltage switching device is capable of outputting a voltage switching signal to the voltage applying device, so that the first voltage is temporally applied to the motor at a predetermined timing during the application of the second voltage to the motor for driving the motor. The first voltage is set to have a value capable of producing electric discharges between the commutator and the brushes, destroying an electrically resistive film and inhibiting growth of the electrically resistive film when the electrically resistive film is produced between the commutator and the brushes.

During the application of the first voltage (high voltage), growth of the electrically resistive film is inhibited, and therefore, increase with time of the contact resistance between the commutator and the brushes is prevented. Hence, the rotational speed of the motor may not be lowered with time and the flow rate of the fuel pumped by the fuel pump may not be lowered.

On the other hand, during the application of the second voltage (low voltage), the discharge energy is small, and therefore, it is not possible to destroy the electrically resistive film enough. Therefore, growth of the electrically resistive film may continue to increase the contact resistance between the commutator and the brushes. Hence, the rotational speed of the motor may be gradually lowered with time.

However, the first voltage is temporally applied to the motor at a predetermined timing during the application of the second voltage to the motor. Therefore, during the application of the second voltage, the electrically resistive film can be destroyed by the discharge energy produced between the commutator and the brushes. In other words, cleaning of a clearance between the commutator and the brushes can be performed temporally at a predetermined timing. Therefore, it is possible to prevent the contact resistance between the commutator and the brushes from increasing over a tolerable value. Hence, it is possible to prevent the rotational speed of the motor from decreasing to be lower than a tolerable range, and consequently, it is possible to prevent the flow rate of the fuel from decreasing to be lower than a tolerable range.

The voltage switching device may output the voltage switching signal to the voltage applying device so that the first voltage is applied to the motor when a rotational speed of the motor has been decreased from a reference rotational speed over a tolerable range during the application of the second voltage to the motor for driving the motor. This may enable cleaning of a clearance between the commutator and the brushes at suitable timings.

The voltage applying device may include a resistor that can lower the first voltage to the second voltage. Alternatively, the voltage applying device may control a pulse width of a voltage signal applied to the motor, so that a mean voltage applied to the motor is selectively adjusted to the first voltage or the second voltage.

Figure 3:
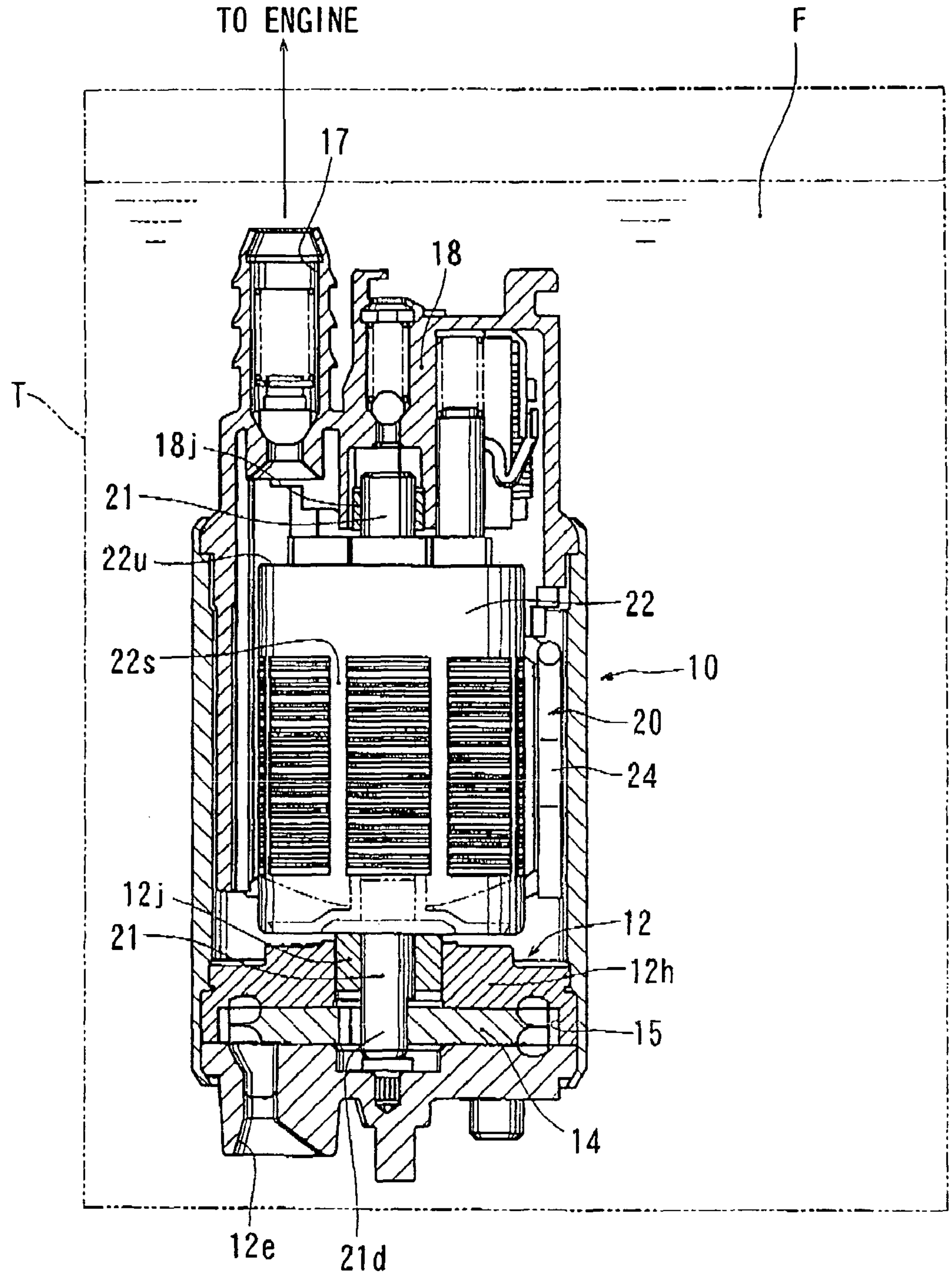
FIG. 3 is a vertical sectional view of the fuel pump.
Figure 4:
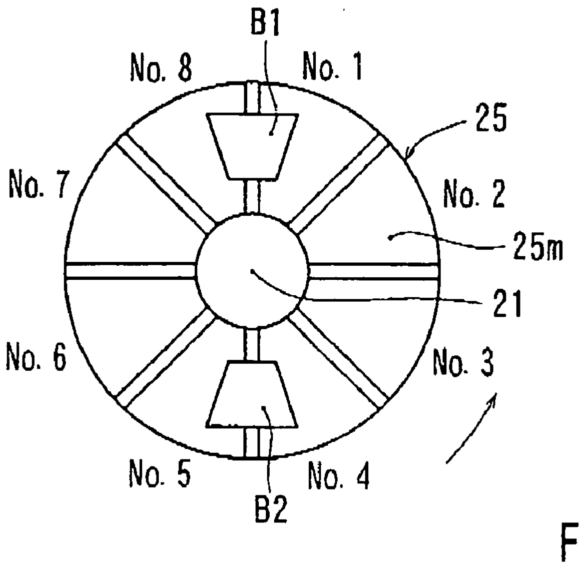
FIG. 4(A) is a plan view showing the relationship between a commutator and brushes of the fuel pump motor.
FIG. 4(B) is a schematic wiring diagram of the fuel pump motor.
FIGS. 4(C) and 4(D) are side views of a part of the fuel pump motor showing the relationship between the fuel pump motor and one of the brushes.
Figure 4:
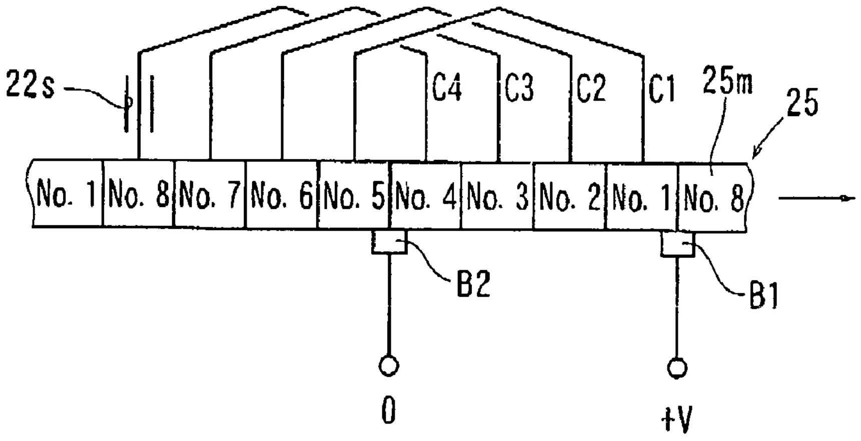
Figure 4:
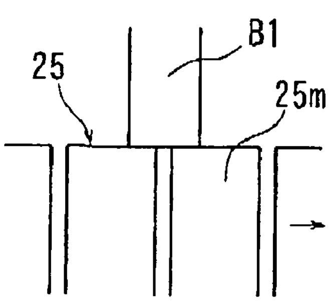
Figure 4:
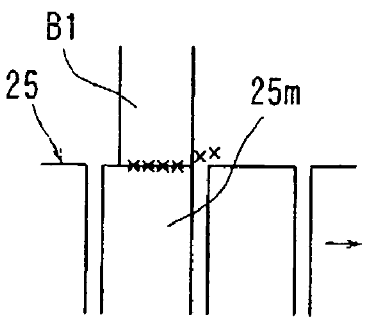
Figure 5:
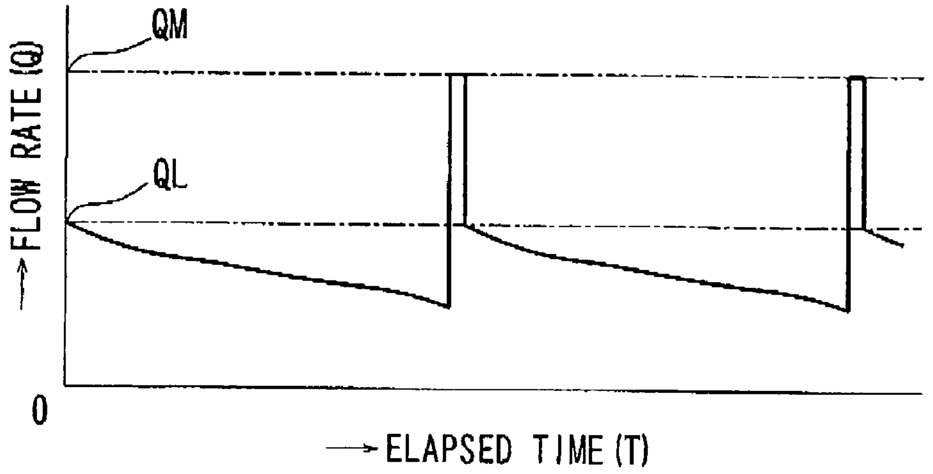
FIG. 5(A) is a graph showing change of a flow rate of the pumped fuel with time.
FIG. 5(B) is a graph showing change of a voltage applied to the fuel pump motor with time.
Figure 5:
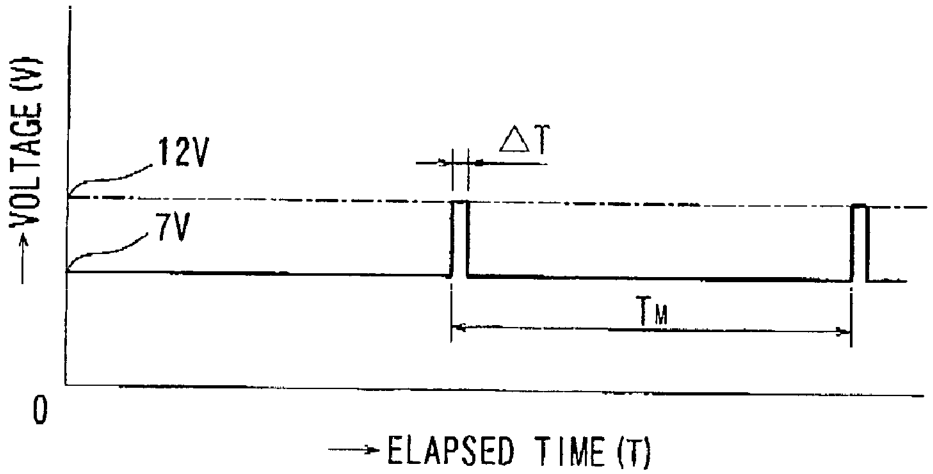
Figure 6:
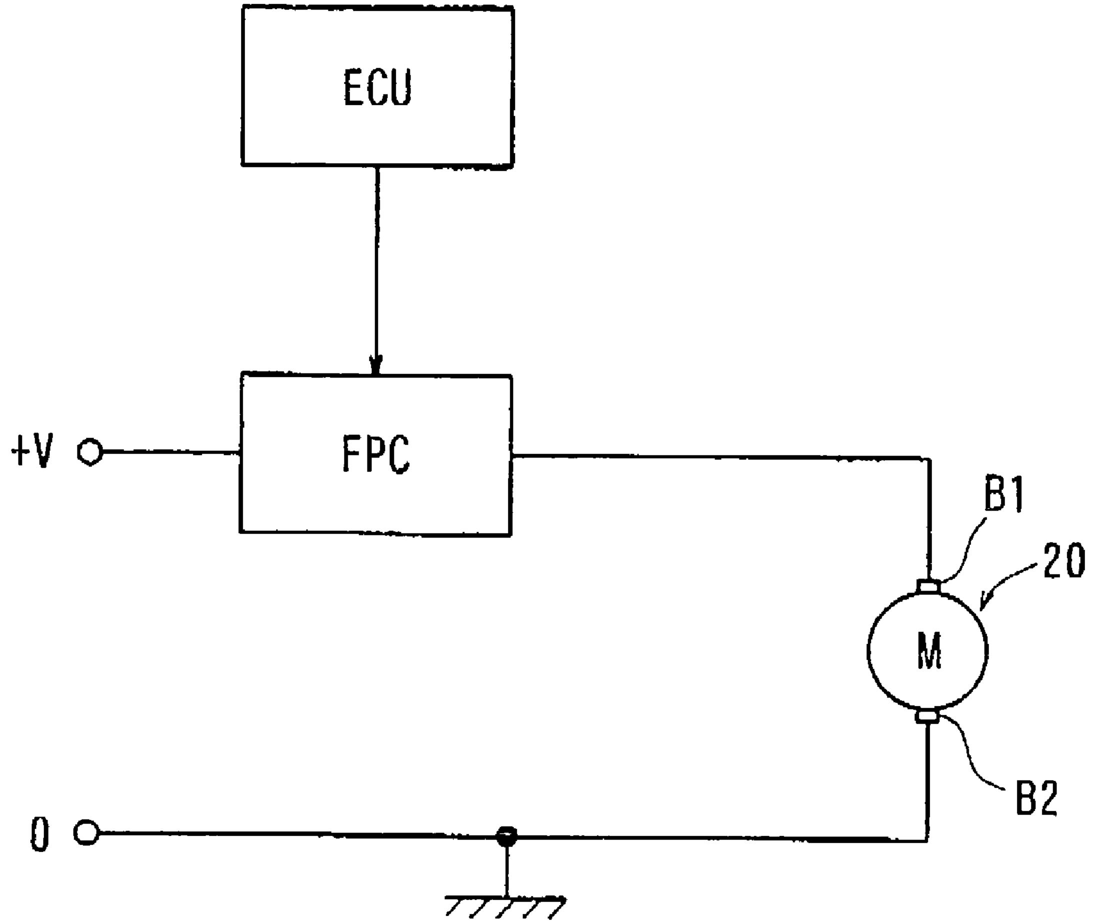
FIG. 6 is a schematic circuit configuration of a control device for controlling a fuel pump motor according to an alternative embodiment of the present invention.

An embodiment of the present invention will now be described with reference to FIGS. 1 to 6. This embodiment relates to a motor for a fuel pump that can be used, for example, for a fuel supply system of an automobile. Referring to FIG. 3, the fuel supply system can deliver a fuel F within a fuel tank T to an injector(s) of an engine. The fuel supply system includes a fuel pump 10, a fuel pressure regulating device (not shown) and a fuel passage, etc.

As shown in FIG. 3, the fuel pump 10 is configured as a motor-integrated pump and includes an impeller-type pump section 12 for drawing, pressurizing and discharging the fuel F and a motor section 20 for driving the pump section 12. The pump section 12 is disposed on the lower side of the motor section 20 and has a lower portion with a suction port 12*e* provided for drawing the fuel F. A suction filter (not shown) may be attached to the suction port 12*e*. As an impeller 14 of the pump section 12 rotates, the fuel F is drawn into the pump section 12, pressurized within a flow path groove 15*a* defined within the pump section 12, and discharged into the motor section 20 via a communication port (not shown). As the fuel discharged from the communication port flows upward through the motor section 20, the fuel may cool the motor section 20 and lubricate and clean a rotary portion of the motor section 20. Thereafter, the fuel may be discharged from a discharge port 17 provided at an upper end of the fuel pump 10. The fuel discharged from the discharge port 17 is filtered by a high-pressure filter (not shown), regulated to a predetermined pressure by the pressure regulating device, and subsequently delivered to the injector(s) of the engine via the fuel passage.

<Motor Section>

The motor section 20 is a drive source of the pump section 12 and includes a rotary shaft 21 having a lower end 21*d*, to which the impeller 14 is coaxially joined to rotate together with the rotary shaft 21.

The motor section 20 is a two-pole and eight-slot type DC motor and includes a cylindrical stator 24 with permanent magnets, and an armature 22 disposed coaxially within the stator 24 and spaced from the stator 24 by a uniform space in the circumferential direction. The rotary shaft 21 is mounted coaxially with the armature 22 and has upper and lower ends protruding from upper and lower axial ends of the armature 22. The lower end of the rotary shaft 21 is supported by a bearing 12*j* mounted to a case 12*h* of the pump section 12 and the upper end of the rotary shaft 21 is supported by a bearing 18*j* mounted to a cover 18 of the fuel pump motor 20.

Eight linear slots 22*s* are formed in the outer circumferential surface of the armature 22 and extend parallel to an axial direction of the armature 22. The linear slots 22*s* are spaced equally from each other in the circumferential direction. Four coils C1, C2, C3 and C4 are wound around the outer circumferential surface of the armature 22 by using the respective linear slots 22*s* (see FIG. 4(B)). As shown in FIG. 4(A), a commutator 25 including eight commutator segments 25*m* (hereinafter also called "No. 1 to No. 8 segments 25*m*) are fixed to the circumference of the rotary shaft 21. Opposite ends of the four coils C1 to C4 are connected to the eight commutator segments 25*m*, respectively, in a predetermined order as shown in FIG. 4(B). Therefore, the four coils C1 to C4 are connected to the respective commutator segments 25*m* of the commutator 25 while they are electrically insulated from each other. FIG. 4(B) shows the commutator segment 25 in developed form.

Brushes B1 and B2 provided on the side of the stator 24 are slidably movably pressed against the commutator 25. The brushes B1 and B2 are positioned on opposite side with respect to the central axis of the stator 24. The brushes B1 and B2 are connected to a positive terminal side and a negative terminal side of an electric power source, respectively.

<Control Device for Fuel Pump Motor>

As shown in FIG. 1, a control device 40 for controlling the fuel pump motor 20 is constituted by a voltage applying device 43 and an engine control unit (ECU) that can output a voltage switching signal to the voltage applying device 43. The voltage applying device 43 is configured to be able to selectively apply a first voltage (e.g., about 12V) or a second voltage (e.g., about 7V) to the fuel pump motor 20. The first voltage may be equal to a power source voltage. More specifically, the voltage applying device 43 includes a relay 45 capable of switching between a side of a high-voltage circuit 46 and a side of a low-voltage circuit 47 according to the output signal of the ECU.

When the relay 45 is switched to the side of the high-voltage circuit 46, the first voltage equal to the power source voltage is applied to the fuel pump motor 20. On the other hand, when the relay 45 is switched to the side of the low-voltage circuit 47, the power source voltage is lowered to the second voltage by a resistor R, so that the second voltage is applied to the fuel pump motor 20.

As described above, the ECU outputs the switching signal to the voltage applying device 43. In addition, the ECU can temporally output the switching signal to the voltage applying device 43 for switching from the second voltage to the first voltage when the actual rotational speed of the fuel pump motor 20 has lowered from a reference rotational speed corresponding to the second voltage by a predetermined value. Here, the reference rotational speed is a rotational speed of the fuel pump motor 20 when the fuel pump 10 pumps the fuel F at a flow rate QL shown in FIG. 2(A).

The ECU can calculate the rotational speed of the fuel pump motor 20 based on a current signal of the fuel pump motor 20 obtained at a shunt resistor Sh. For example, during one revolution of the fuel pump motor 20, all the Nos. 1 to 8 commutator segments 25*m* of the commutator 25 in turn move to slide on the brush B1. Therefore, the current flows through the coils C1 to C4 in the order of C1-C2-C3-C4-C1-C2-C3-C4 (see FIG. 4(B)). The ECU monitors the waveforms of the current applied to the fuel pump motor 20 and determines that the fuel pump motor 20 has rotated at one revolution when eight peaks of the waveforms have been detected.

Then, the ECU compares time TS for one revolution at the reference rotational speed with an actual time TL determined by the above detection of the peaks of current waveforms. If a difference (TL−TS) between these times TS and TL exceeds a tolerable time tw, the ECU outputs the switching signal to the voltage applying device 43 during a predetermined period of time ΔT to switch from the second voltage to the first voltage. Here, the period of time ΔT after switching from the second voltage to the first voltage and before returning from the first voltage to the second voltage can be adjusted between 0.1 to 60 seconds.

<Operation of Control Device>

Figure 7:
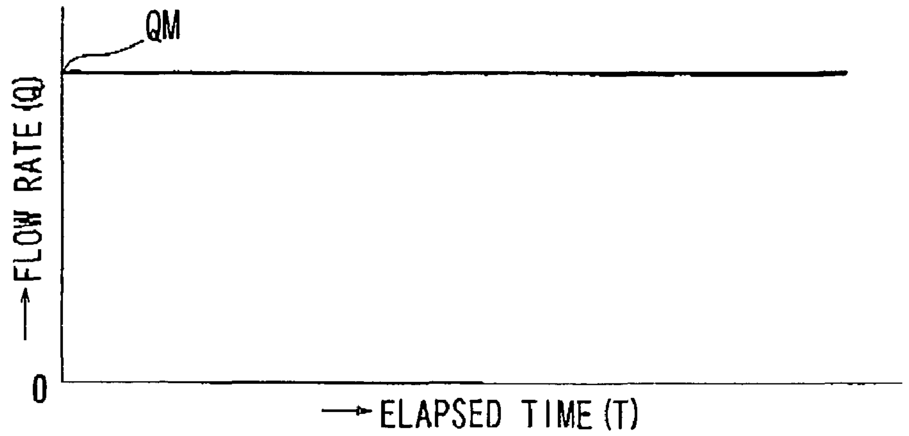
FIGS. 7(A) and 7(B) are a graph showing change of a flow rate of a fuel pumped by a known fuel pump and a graph showing a constant voltage with time, respectively, when a high voltage is applied to the known fuel pump motor.
FIGS. 7(C) and 7(D) are a graph showing change of the flow rate of the fuel pumped by the known fuel pump and a graph showing a constant voltage with time, respectively, when a low voltage is applied to the know fuel pump motor.
Figure 7:
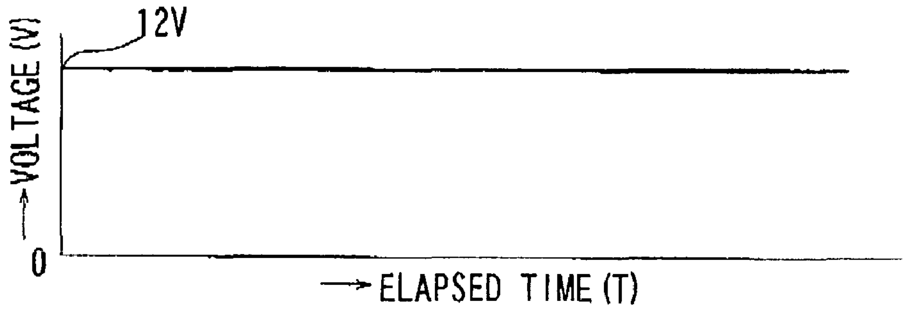
Figure 7:
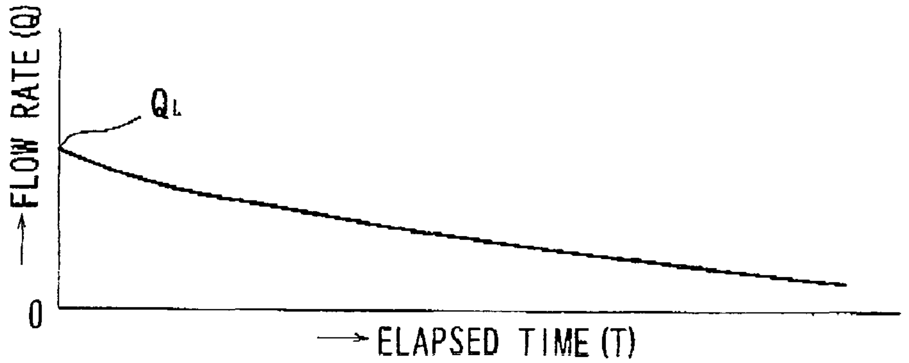
Figure 7:
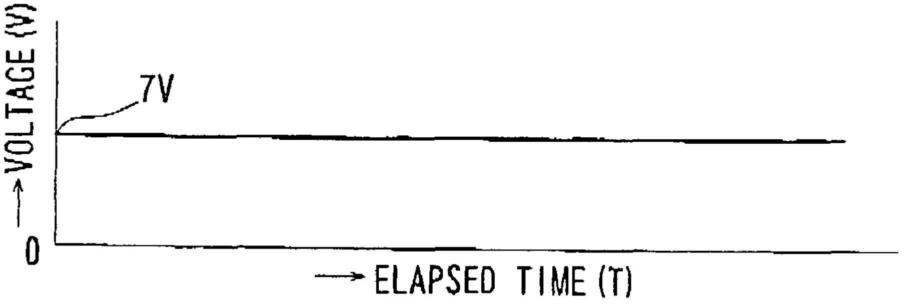

In order to switch the flow rate of fuel pumped by the fuel pump 10 to a high-flow rate QM in response to the operating condition of the engine, the ECU outputs a signal to the voltage applying device 43 to switch the relay 45 to the side of the high-pressure circuit 46. Then, the first voltage is applied to the fuel pump motor 20 to cause high-speed rotation of the fuel pump motor 20. As a result, the rotational speed of the impeller 14 of the fuel pump 10 increases to achieve the high-flow rate QM of the pumped fuel (see FIGS. 7(A) and 7(B)).

As described previously in connection with the background art, an electrically resistive film may be formed between the commutator 25 and the brushes B1 and B2 during the operation of the fuel pump motor 20. However, electric discharges may be produced at portions indicated by "xx---" in FIG. 4(D) between the commutator 25 and the brushes B1 and B2 during the operation of the fuel pump motor 20, and therefore, the electrically resistive film may be destroyed by the energy of the electric discharges.

For example, in the case that the voltage applied to the fuel pump motor 20 is set to the first voltage (i.e., high voltage of about 12V), the electrically resistive film may be destroyed by the discharge energy, so that potential growth of the electrically resistive film between the commutator 25 and the brushes B1 and B2 can be inhibited. Hence, it is possible to prevent increase with time of contact resistance between the commutator 25 and the brushes B1 and B2. As a result, the rotational speed of the fuel pump motor 20 can be maintained to be substantially constant, and the flow rate of the fuel pumped by the fuel pump 10 may not be lowered from the initial high flow rate QM.

The flow rate of the fuel pumped by the fuel pump 10 can be changed from the high flow rate QM to the low flow rate QL according to the operation condition of the engine. Thus, the ECU outputs a switching signal to the voltage applying device 43 for switching the relay 45 from the side of the high-pressure circuit 46 to the side of the low pressure circuit 47. Therefore, the second voltage (i.e., low voltage of about 7V) is applied to the fuel pump motor 20, so that the fuel pump motor 20 rotates at a low speed. As a result, the rotational speed of the impeller 14 of the fuel pump 10 is decreased and the flow rate of the pumped fuel is decreased to the low flow rate QL (see FIG. 2(A)).

However, in the case that the voltage applied to the fuel pump motor 20 is set to the low voltage, the energy of electric discharges between the commutator 25 and the brushes B1 and B2 may be small and may not enough to destroy the electrically resistive film. In such a case, the electrically resistive film may grow to cause increase of contact resistance between the commutator 25 and the brushes B1 and B2, so that the rotational speed of the fuel pump motor 20 is gradually lowered. Consequently, the flow rate of the fuel pumped by the fuel pump 10 may decrease from the initial flow rate QL with time as shown in FIG. 2(A).

As described previously, the ECU compares the period of time TS during one revolution at the reference rotational speed and the period of time TL during one revolution at the actual (current) rotational speed. If the difference (TL−TS) between the period of time TS and the period of time TL exceeds the tolerable time tw, in other words, if the rotational speed of the motor 20 has been lowered over a tolerable range from the reference rotational speed, the ECU outputs a signal to the voltage applying device 43 in order to switch the voltage from the low voltage to the high voltage temporally during the predetermined period of time ΔT. Therefore, the electrically resistive film produced between the commutator 25 and the brushes B1 and B2 can be destroyed by the discharge energy and a clearance between the commutator 25 and the brushes B1 and B2 can be cleaned. Hence, it is possible to prevent the contact resistance between the commutator 25 and the brushes B1 and B2 from exceeding a tolerable value, and the rotational speed of the fuel pump motor 20 may not be lowered to exceed a tolerable range from the reference rotational speed. As a result, the flow rate of the fuel pumped by the fuel pump 10 may not be decreased from the initial flow rate QL over a tolerable range.

According to the control device 40 for the fuel pump motor 20 of this embodiment, the first voltage is set to such a voltage that can produce electric discharges between the commutator 25 and the brushes B1 and B2 and can destroy an electrically resistive film produced between the commutator 25 and the brushes B1 and B2 by the produced electric discharges in order to prevent growth of the electrically resistive film. Thus, during the application of the high voltage to the fuel pump motor 20, the electrically resistive film may not grow and the contact resistance between the commutator 25 and the brushes B1 and B2 may not increase with time. As a result, the rotational speed of the fuel pump motor 20 may not be lowered with time and the flow rate of the pumped fuel may not be reduced from QM.

On the other hand, if the second voltage (i.e., low voltage of about 7V) is applied, the discharge energy cannot destroy enough the electrically resistive film between the commutator 25 and the brushes B1 and B2. Therefore, the electrically resistive film may grow to increase the contact resistance between the commutator 25 and the brushes B1 and 82, causing gradual decrease of the rotational speed of the fuel pump motor 20.

However, when the rotational speed of the fuel pump motor 20 decreases over a tolerable range, a high voltage is applied to the fuel pump motor 20 temporally (within the predetermined period of time ΔT) by the operations of the ECU and the voltage applying device 43. Therefore, the electrically resistive film produced between the commutator 25 and the brushes B1 and B2 can be destroyed enough during the application of the high voltage. Hence, the clearance between the commutator 25 and the brushes B1 and B2 can be cleaned during the predetermined period of time ΔT, so that contact resistance between the commutator 25 and the brushes B1 and B2 may be lowered. Hence, the rotational speed of the fuel pump motor 20 may not be lowered to exceed a tolerable range from the reference rotational speed. As a result, the flow rate of the fuel pumped by the fuel pump 10 may not be decreased from the initial flow rate Q over a tolerable range. This means that insufficient acceleration of rotational speed of the engine may not be caused even if the fuel pump 10 is operated during a long time while the flow rate of the pumped fuel being switched to the initial flow rate QL or a low flow rate.

The present invention may not be limited to the above embodiment but may be modified in various ways. For example, according to the above embodiment, the first or high voltage is applied to the fuel pump motor 20 during the predetermined period of time ΔT when the rotational speed of the motor 20 is lowered to exceed a tolerable value during the low voltage operation of the fuel pump motor 20. However, as shown in FIGS. 5(A) and 5(B), it is possible to automatically apply the first or high voltage to the fuel pump motor 20 during the predetermined period of time ΔT each after the fuel pump motor 20 has been operated at the low voltage by a predetermined period of time TM, such as 0.5 to 2 hours, by measuring the period of low voltage operation of the fuel pump motor 20 using a timer.

In addition, although the voltage applying device 43 is operable to change between the high voltage and the low voltage by the relay 45, it is possible to change or modulate a pulse width of the voltage signal by a fuel pump controller (FFC) serving as a pulse-width modulator in order to set a mean value of the voltage to be a high voltage value or a low voltage value.

Further, although the fuel pump motor 20 of the above embodiment is exemplified as a two-pole and eight slot type DC motor, it is possible to suitably change the number of the slots.

The invention claimed is:

1. A control device for controlling a motor having a commutator and brushes of a fuel pump, comprising:

a voltage applying device operable to selectively apply a first voltage a second voltage to the motor, the second voltage being lower than the first voltage; and a voltage switching device capable of outputting a voltage switching signal to the voltage applying device, so that the first voltage is temporally applied to the motor at a predetermined timing during the application of the second voltage to the motor for driving the motor;

wherein the first voltage is set to have a value capable of producing electric discharges between the commutator and the brushes, destroying an electrically resistive film and inhibiting growth of the electrically resistive film when the electrically resistive film is produced between the commutator and the brushes;

wherein the first voltage is equal to a power source voltage;

wherein the second voltage is a normal voltage for driving the motor; and wherein the voltage applying device includes a low voltage circuit configured to lower the first voltage to the second voltage.

2. The control device as in claim 1, wherein the voltage switching device can output the voltage switching signal to the voltage applying device so that the first voltage is applied to the motor when a rotational speed of the motor has been decreased from a reference rotational speed over a tolerable range during the application of the second voltage to the motor for driving the motor.

3. The control device as in claim 2, wherein the low voltage circuit of the voltage applying device comprises a resistor that can lower the first voltage to the second voltage.

4. The control device as in claim 2, wherein the low voltage circuit is configured to control a pulse width of a voltage signal of the first voltage.

5. The control device as in claim 1, wherein the low voltage circuit of the voltage applying device comprises a resistor that can lower the first voltage to the second voltage.

6. The control device as in claim 1, wherein the low voltage circuit is configured to control a pulse width of a voltage signal of the first voltage.

* * * * *